(12) United States Patent
Suzuki et al.

(10) Patent No.: US 11,565,705 B2
(45) Date of Patent: Jan. 31, 2023

(54) ROAD SURFACE STATE DETERMINATION DEVICE

(71) Applicant: DENSO CORPORATION, Kariya (JP)

(72) Inventors: Yoichiro Suzuki, Nisshin (JP); Takatoshi Sekizawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 301 days.

(21) Appl. No.: 16/904,260

(22) Filed: Jun. 17, 2020

(65) Prior Publication Data

US 2020/0317203 A1 Oct. 8, 2020

Related U.S. Application Data

(63) Continuation of application No. PCT/JP2018/046940, filed on Dec. 20, 2018.

(30) Foreign Application Priority Data

Dec. 22, 2017 (JP) .............................. JP2017-246842

(51) Int. Cl.
*B60W 40/06* (2012.01)
*B60C 19/00* (2006.01)
*G01H 17/00* (2006.01)

(52) U.S. Cl.
CPC ............ *B60W 40/06* (2013.01); *B60C 19/00* (2013.01); *G01H 17/00* (2013.01);
(Continued)

(58) Field of Classification Search
CPC .................................................... B60W 40/06
See application file for complete search history.

(56) References Cited

U.S. PATENT DOCUMENTS 7,032,436 B2* 4/2006 Yokota ................. B60C 23/065
73/11.04
9,434,387 B2* 9/2016 Hanatsuka ............. B60C 99/00
(Continued)

FOREIGN PATENT DOCUMENTS

JP 2007055284 A 3/2007
JP 2014035279 A 2/2014
(Continued)

OTHER PUBLICATIONS

U.S. Appl. No. 16/910,778, filed Jun. 24, 2020, Sanji.
(Continued)

*Primary Examiner* — Michael A Berns
(74) *Attorney, Agent, or Firm* — Harness, Dickey & Pierce, P.L.C.

(57) ABSTRACT

A road surface state determination device includes a tire-side device and a vehicle-body-side system. The tire-side device is attached to a back surface of a tread of each of a plurality of tires included in a vehicle. The vehicle-body-side system is included in a body of the vehicle. The tire-side device outputs a detection signal corresponding to a magnitude of vibration applied to the tire. The tire-side device generates road surface data indicative of a road surface state appearing in a waveform of the detection signal. The tire-side device transmits the road surface data. The vehicle-body-side system performs bidirectional communication with the tire-side device and receives the road surface data. The vehicle-body-side system determines the road surface state of a road surface on which the vehicle is traveling based on the road surface data.

10 Claims, 6 Drawing Sheets

(52) U.S. Cl.
CPC .... *B60C 2019/004* (2013.01); *B60C 2200/04* (2013.01); *B60W 2530/20* (2013.01)

(56) References Cited

U.S. PATENT DOCUMENTS

| | | | |
|---|---|---|---|
| 10,866,161 B2* | 12/2020 | Suzuki | G07C 5/02 |
| 10,946,861 B2* | 3/2021 | Sekizawa | G01M 17/02 |
| 11,187,645 B2* | 11/2021 | Masago | G01N 19/02 |
| 11,376,901 B2* | 7/2022 | Suzuki | B60T 8/1725 |
| 2002/0162389 A1 | 11/2002 | Yokota et al. | |
| 2015/0210286 A1 | 7/2015 | Hanatsuka et al. | |
| 2020/0049497 A1* | 2/2020 | Suzuki | G01B 17/08 |
| 2020/0208969 A1* | 7/2020 | Suzuki | B60C 23/0408 |
| 2020/0255019 A1* | 8/2020 | Sekizawa | H04W 4/48 |
| 2020/0256672 A1* | 8/2020 | Sekizawa | G06N 20/10 |
| 2020/0284648 A1* | 9/2020 | Kanbayashi | B60K 35/00 |
| 2020/0309518 A1* | 10/2020 | Kanbayashi | H04W 4/40 |
| 2020/0317203 A1* | 10/2020 | Suzuki | B60W 40/06 |
| 2020/0319020 A1* | 10/2020 | Sanji | B60C 99/00 |

FOREIGN PATENT DOCUMENTS

| | | |
|---|---|---|
| WO | WO-2001098123 A1 | 12/2001 |
| WO | WO-2019131567 A1 | 7/2019 |
| WO | WO-2019142868 A1 | 7/2019 |

OTHER PUBLICATIONS

U.S. Appl. No. 16/929,862, filed Jul. 15, 2020, Suzuki.
U.S. Appl. No. 16/859,524, filed Apr. 26, 2020, Sekizawa.
U.S. Appl. No. 16/859,799, filed Apr. 26, 2020, Sekizawa.

* cited by examiner

ROAD SURFACE STATE DETERMINATION DEVICE

CROSS REFERENCE TO RELATED APPLICATIONS

The present application is a continuation application of International Patent Application No. PCT/JP2018/046940 filed on Dec. 20, 2018, which designated the U.S. and claims the benefit of priority from Japanese Patent Application No. 2017-246842 filed on Dec. 22, 2017. The entire disclosures of all of the above applications are incorporated herein by reference.

TECHNICAL FIELD

The present disclosure relates to a road surface state determination device which detects vibration of a tire received by a tire-side device, generates road surface data indicative of a road surface state based on vibration data, transmits the road surface data to a vehicle-body-side system, and determines the road surface state based on the road surface data.

BACKGROUND

A road surface state determination device that has an acceleration sensor provided in a back surface of a tire tread of a tire, detects vibration applied to the tire using the acceleration sensor, and estimates a road surface state based on a detection result of the vibration has been proposed. The road surface state determination device generates data related to the road surface state based on a waveform of the vibration applied to the tire and detected by the acceleration sensor, and transmits the data for each of wheels to a vehicle-body-side receiver or the like to estimate the road surface state.

SUMMARY

The present disclosure provides a road surface state determination device that includes a tire-side device and a vehicle-body-side system. The tire-side device is attached to a back surface of a tread of each of a plurality of tires included in a vehicle. The vehicle-body-side system is included in a body of the vehicle. The tire-side device outputs a detection signal corresponding to a magnitude of vibration applied to the tire. The tire-side device generates road surface data indicative of a road surface state appearing in a waveform of the detection signal. The tire-side device transmits the road surface data. The vehicle-body-side system performs bidirectional communication with the tire-side device and receives the road surface data. The vehicle-body-side system determines the road surface state of a road surface on which the vehicle is traveling based on the road surface data.

BRIEF DESCRIPTION OF DRAWINGS

The features and advantages of the present disclosure will become more apparent from the following detailed description made with reference to the accompanying drawings. In the drawings.

DETAILED DESCRIPTION

Figure 1:
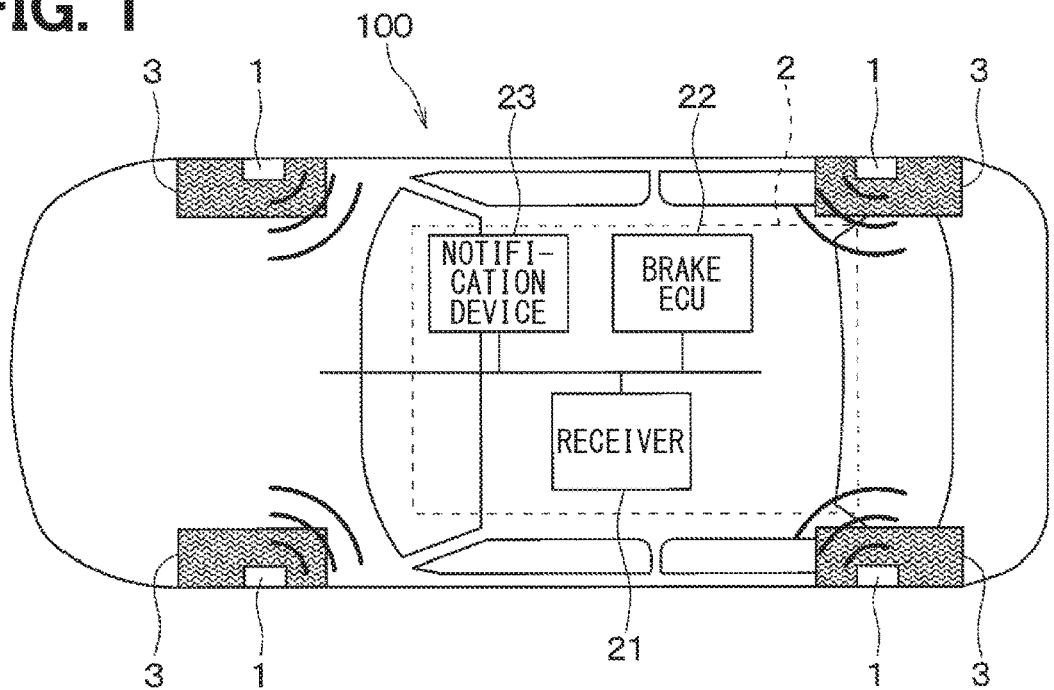
FIG. 1 is a diagram illustrating a tire device to which a tire-side device according to a first embodiment is applied in a state where the tire device is mounted on a vehicle.

For example, when waveform of vibration applied to a tire is sampled, it is necessary to estimate a vehicle speed and then determine a sampling condition. In order to estimate the vehicle speed, it is required to perform sampling for at least two rotations of the tire, and therefore the estimation of the vehicle speed takes time. Thus, the waveform of the vibration applied to the tire cannot be sampled with good responsiveness.

The present disclosure to provide a road surface state determination device which determines a sampling condition for acquiring a waveform of vibration applied to a tire with good responsiveness.

An exemplary embodiment of the present disclosure provides a road surface state determination device that includes a tire-side device and a vehicle-body-side system. The tire-side device is attached to a back surface of a tread of each of a plurality of tires included in a vehicle. The vehicle-body-side system is included in a body of the vehicle. The tire-side device includes a vibration detection unit, a control unit, and a first data communication unit. The vibration detection unit is configured to output a detection signal corresponding to a magnitude of vibration applied to the tire. The control unit is configured to acquire the detection signal and generate road surface data indicative of a road surface state appearing in a waveform of the detection signal. The first data communication unit is configured to transmit the road surface data. The vehicle-body-side system includes a second data communication unit, a road surface determination unit, and a vehicle speed data acquisition unit. The second data communication unit is configured to perform bidirectional communication with the tire-side device and receive the road surface data. The road surface determination unit is configured to determine the road surface state of a road surface on which the vehicle is traveling based on the road surface data. The vehicle speed data acquisition unit is configured to acquire vehicle speed data provided as data corresponding to a vehicle speed which is a speed of the vehicle and cause the second data communication unit to transmit the vehicle speed data to the tire-side device. The control unit includes an acquisition setting unit configured to set an acquisition condition for acquiring the detection signal based on the vehicle speed data.

In the exemplary embodiment of the present disclosure, when the road surface data to be used in determining the road surface state is generated, the vehicle-body-side system is caused to transmit the vehicle speed data. Then, the control unit sets the acquisition condition based on the vehicle speed data, and the vibration detection unit acquires the detection signal. This configuration enables sampling for acquiring the road surface data at an earlier time. Therefore, it is possible to determine the sampling condition for the waveform of vibration applied to the tire with good responsiveness.

Hereinafter, some embodiments of the disclosure are described with reference to the accompanying drawings. In the following embodiments, the same or equivalent parts are designated by like reference signs for explanation.

First Embodiment

Referring to FIGS. 1 to 7, a description will be given of a tire device 100 having a road surface state determination function according to a first embodiment. The tire device 100 according to the first embodiment determines a road surface state during traveling based on vibration applied to a ground contact surface of a tire provided in each of wheels of a vehicle, and also performs warning of danger to the vehicle, vehicle movement control, and the like based on the road surface state.

Figure 2:
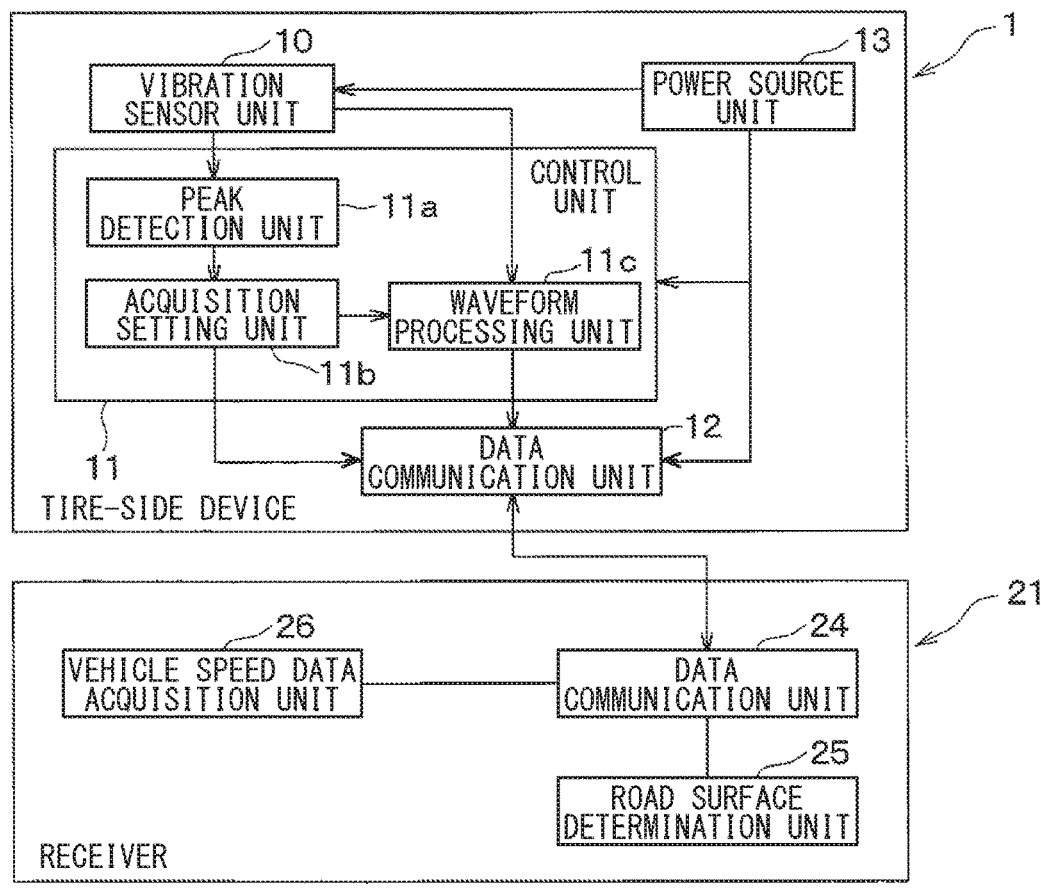
FIG. 2 is a block diagram illustrating the tire-side device and a vehicle-body-side system.

As illustrated in FIGS. 1 and 2, the tire device 100 includes a tire-side device 1 provided on a wheel and a vehicle-body-side system 2 provided on a vehicle body. The vehicle-body-side system 2 includes a receiver 21, an electronic control device for brake control (hereinafter referred to as a brake ECU) 22, a notification device 23, and the like. Note that a portion of the tire device 100 which implements the road surface state determination function corresponds to a road surface state determination device. In the first embodiment, the tire-side devices 1 and the receiver 21 of the vehicle-body-side system 2 are included in the road surface state determination device.

The tire device 100 of the first embodiment causes the tire-side device 1 to transmit data (hereinafter referred to as road surface data) corresponding to a road surface state traveled by tires 3, and also causes the receiver 21 to receive the road surface data and determine the road surface state. The tire device 100 also transmits a result of the road surface state determined by the receiver 21 to the notification device 23, and causes the notification device 23 to report the result of the determination of the road surface state. As a result, it becomes possible to report the road surface state such as, e.g., a dry road, a wet road, or a frozen road to a driver and also warn the driver when the driver drives a slippery road surface. The tire device 100 also reports the road surface state to the brake ECU 22 which controls vehicle movement or the like to cause the brake ECU 22 or the like to perform vehicle movement control for avoiding danger. For example, when the road is frozen, the brake ECU 22 or the like is caused to reduce a braking force generated based on an amount of brake operation compared to a braking force when the road is dry. Thus, the brake ECU 22 performs vehicle movement control corresponding to a case where a road surface p is low. Specifically, the tire-side device 1 and the vehicle-body-side system 2 are configured as follows.

Figure 3:
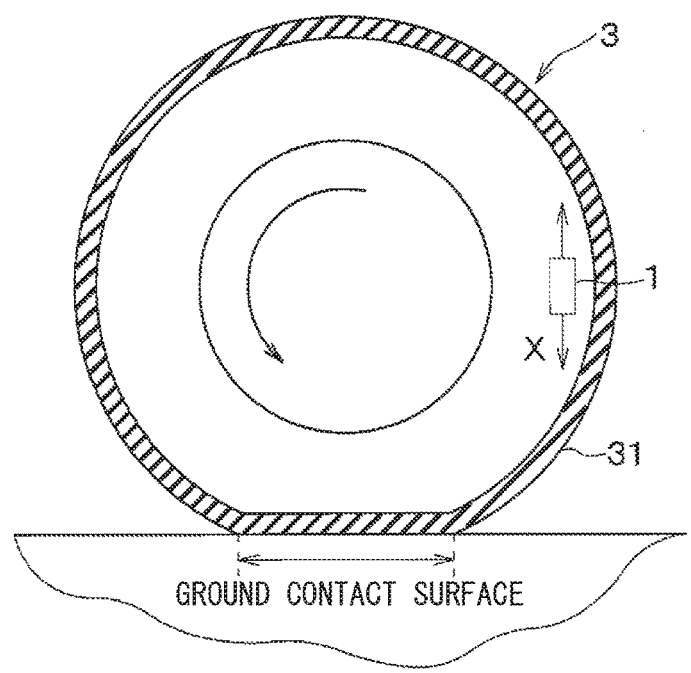
FIG. 3 is a sectional schematic diagram illustrating a tire to which the tire-side device is attached.

As illustrated in FIG. 2, the tire-side device 1 includes a vibration sensor unit 10, a control unit 11, a data communication unit 12, and a power source unit 13. As illustrated in FIG. 3, the tire-side device 1 is provided on a back surface of a tread 31 of the tire 3.

The vibration sensor unit 10 is provided by a vibration detection unit for detecting the vibration applied to the tire 3. For example, the vibration sensor unit 10 is provided by an acceleration sensor. When the vibration sensor unit 10 is provided by the acceleration sensor, the vibration sensor unit 10 outputs an acceleration detection signal as a detection signal corresponding to a magnitude of vibration in a direction in contact with a circular path followed by the tire-side device 1 when the tire 3 rotates, i.e., a tire tangential direction shown by an arrow X in FIG. 3. More specifically, the vibration sensor unit 10 generates, as the detection signal, an output voltage having one of two directions shown by the arrow X as a positive direction and the opposite direction as a negative direction or the like. For example, the vibration sensor unit 10 detects an acceleration at a predetermined sampling period which is shorter than a period of one rotation of the tire 3, and outputs the detected acceleration as the detection signal. The detection signal from the vibration sensor unit 10 is represented as an output voltage or an output current, and a case where the detection signal is represented as the output voltage is described herein by way of example.

The control unit 11 is provided by a known microcomputer including a CPU, a ROM, a RAM, an I/O, and the like, and performs signal processing of the detection signal based on a program stored in the ROM or the like to generate road surface data indicative of a road surface state appearing in the detection signal. The control unit 11 includes, as functional units which perform such processes, a peak detection unit 11a, an acquisition setting unit 11b, and a waveform processing unit 11c.

The peak detection unit 11a detects a peak of an output voltage serving as the detection signal from the vibration sensor unit 10.

Figure 4:
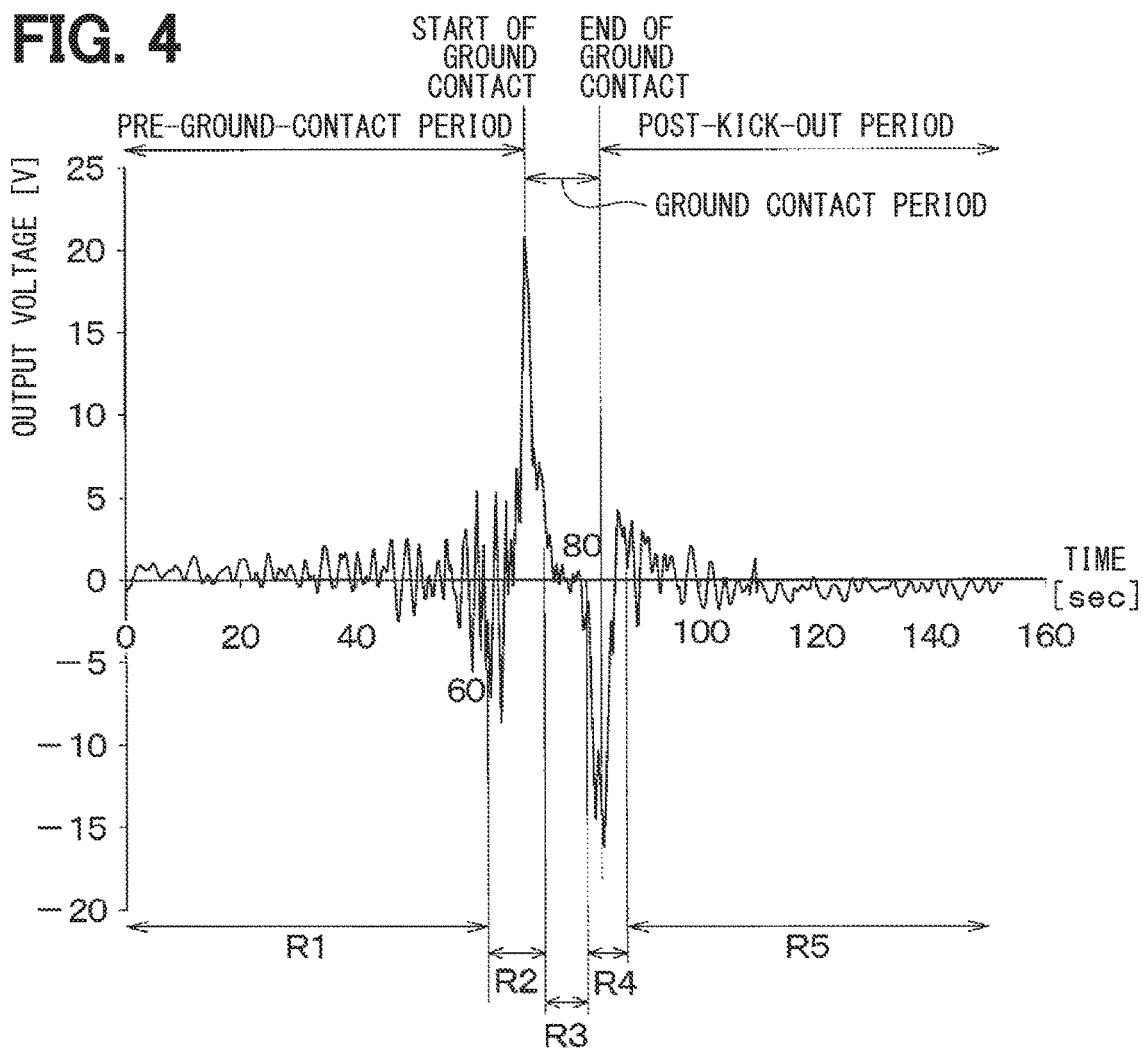
FIG. 4 is a diagram illustrating a waveform of an output voltage from an acceleration acquisition unit during a rotation of a tire.

A waveform of the output voltage of the detection signal from the vibration sensor unit 10 during tire rotation is, e.g., the waveform illustrated in FIG. 4. As illustrated in FIG. 4, at a ground contact start time when a portion (hereinafter referred to as the device mounting position) of the tread 31 corresponding to a place where the vibration sensor unit 10 is disposed starts to come into contact with the ground with the rotation of the tire 3, the output voltage from the vibration sensor unit 10 has a maximum value. A peak value at the ground contact start time in which the output voltage from the vibration sensor unit 10 has the maximum value is hereinafter referred to as a first peak value. As also illustrated in FIG. 4, at a ground contact end time when the device mounting position, which has been in contact with the ground, comes out of contact with the ground with the rotation of the tire 3, the output voltage from the vibration sensor unit 10 has a minimum value. A peak value at the ground contact end time in which the output voltage from the vibration sensor unit 10 has the minimum value is hereinafter referred to as a second peak value.

The following is the reason why the output voltage from the vibration sensor unit 10 has the peak values at the time points described above. That is, when the device mounting position comes into contact with the ground with the rotation of the tire 3, a portion of the tire 3 which has been a generally cylindrical surface in the vicinity of the vibration sensor unit 10 receives a pressure to be deformed into a planar shape. At this time, the vibration sensor unit 10 receives an impact, and consequently the output voltage from the vibration sensor unit 10 has the first peak value. On the other hand, when the device mounting position comes out of contact with the ground contact surface with the rotation of the tire 3, the tire 3 is released from the pressure in the vicinity of the vibration sensor unit 10 and returned from the planar shape to a generally cylindrical shape. The vibration sensor unit 10 receives an impact when the tire 3 is returned to the original shape, and consequently the output voltage from the vibration sensor unit 10 has the second peak value. Thus, the output voltage from the vibration sensor unit 10 has the first and second peak values at the ground contact start time and the ground contact end time. In addition, since the direction of the impact when the tire 3 receives the pressure is opposite to the direction of the impact when the tire 3 is released from the pressure, signs of the output voltages are also opposite to each other.

A moment when the device mounting position comes into contact with the ground at the road surface is assumed to fall within a "step-on region", while a moment when the device mounting position leaves the road surface is assumed to fall within a "kick-out region". The "step-on region" includes the time point at which the first peak value is reached, while the "kick-out region" includes the time point at which the second peak value is reached. It is also assumed that a region before the "step-on region" is a "pre-step-on region", a region between the step-on region and the kick-out region, i.e., a region where the device mounting position is in contact with the ground is a "pre-kick-out region", and a region after the kick-out region is a "post-kick-out region". Thus, a period during which the device mounting position is in contact with the ground and periods before and after the period can be segmented into the five regions.

Note that, in FIG. 4, the "pre-step-on region", the "step-on region", the "pre-kick-out region", the "kick-out region", and the "post-kick-out region" of the detection signal are successively shown as five regions R1 to R5.

Thus, the waveform of the output voltage of the detection signal from the vibration sensor unit 10 has the peak values at the ground contact start time and the ground contact end time each for the device mounting position. Accordingly, the peak detection unit 11a detects a time point at which the waveform of the output voltage has each of the peak values. Note that, as the peak value, either of the first peak value and the second peak value may be detected, and the first peak value is detected herein.

The acquisition setting unit 11b sets an acquisition condition for acquiring the detection signal from the vibration sensor unit 10, which is performed to generate the road surface data. The acquisition condition indicates a condition for sampling the detection signal. To generate the road surface data, the acquisition setting unit 11b sets, as the sampling condition, a sampling range, i.e., a range in which the detection signal is to be acquired, a time point of starting the acquisition, and a time point of ending the acquisition. The sampling condition also includes a sampling frequency, i.e., a sampling interval or the like. The sampling frequency or the like may have a fixed value for generating the road surface data, but it may be possible to set the sampling frequency higher as, e.g., a vehicle speed is higher and allow detailed road surface data to be obtained even when the vehicle speed is increased.

As described above, the waveform of the output voltage of the detection signal from the vibration sensor unit 10 has a waveform as illustrated in FIG. 4. To generate the road surface data, the detection signal is acquired in a range including at least a portion of a ground contact section in which the device mounting position is in contact with the ground during one tire rotation. Accordingly, it is necessary to recognize which time point is to be used as the acquisition start time point and which time point is to be used as the acquisition end time point. At this time, it is basically preferred to acquire the detection signal in the entire region corresponding to one tire rotation. However, the detection signal need not necessarily be acquired in the entire region corresponding to one tire rotation, and a smaller region including a region required for the generation of the road surface data may be set as the acquisition range. Alternatively, it is also possible to set a region greater than the region corresponding to one tire rotation as the acquisition range. However, to acquire the detection signal, it is required to recognize the acquisition start time point and the acquisition end time point regardless of the acquisition range.

Figure 5A:
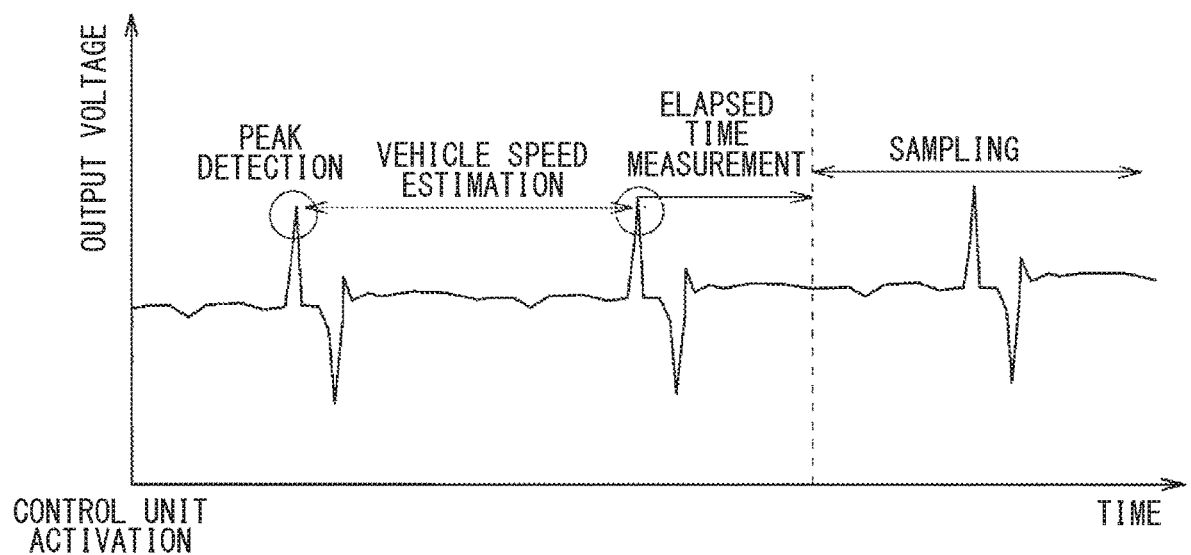
FIG. 5A is a time chart illustrating setting of a sampling range based on a detection signal during consecutive rotations of the tire in accordance with a conventional method.

To satisfy the requirement, the acquisition range for the detection signal has conventionally been set based on the vehicle speed obtained from a time interval between the consecutive first peak values when the tire rotates a plurality of times. Specifically, as illustrated in FIG. 5A, when the tire rotates a plurality of times, the waveform of the output voltage having the first peak value and the second peak value at the ground contact start time and the ground contact end time each for the device mounting position is repeated. The vehicle speed can be determined from the time interval between the consecutive first peak values. Then, based on the vehicle speed, the acquisition range for the detection signal corresponding to one tire rotation is determined, for example, the acquisition start time point and the acquisition end time point are determined. An elapsed time from the second first peak value used in determining the vehicle speed is measured, and the acquisition is started when the acquisition start time point comes. Thereafter, the acquisition of the detection signal is continued and, when the acquisition end time point comes, the acquisition is ended.

Thus, the detection signal corresponding to one tire rotation can be acquired. In this configuration, to determine the vehicle speed, two tire rotations are required, and then the detection signal is acquired. Accordingly, before the acquisition of the detection signal for generating the road surface data, at least three tire rotations are required. To promptly respond to a sudden change in the road surface state, it is desired to generate the road surface data in a shorter period of time. It is preferred to more quickly generate the road surface data after a smallest possible number of tire rotations.

In terms of a battery life, a length of time before the acquisition of the detection signal for generating the road surface data is preferably minimized.

Specifically, the road surface data may be transmitted at a rate of once for every 20 m of driving, i.e., once for ten tire rotations when one rotation is assumed to correspond to 2 m. Except when the vehicle speed is measured and the road surface data is acquired, sampling is not performed. With this configuration, the control unit 11 shifts to a sleep state to reduce power consumption, and when the vehicle speed is to be measured, the control unit 11 is returned to a wakeup state. When the detection signal is acquired in generating the road surface data, detailed data of the waveform of the output voltage is required, and accordingly a sampling period is shortened. However, for the measurement of the vehicle speed, the detailed data is not required, and therefore the sampling period can be elongated. Specifically, it is sufficient for the measurement of the vehicle speed to detect the time point at which the waveform of the output voltage reaches the peak value. As a result, to reduce the power consumption, it is also possible to switch the sampling period when the vehicle speed is measured and when the detection signal is acquired.

However, as a wakeup period is longer during the interval between transmissions of the road surface data, the power consumption increases. Therefore, the road surface data can preferably be generated earlier after a smallest possible number of tire rotations. Even when the sampling period is elongated in the measurement of the vehicle speed, the control unit 11 remains in the wakeup state, and consequently the power consumption cannot sufficiently be reduced.

Accordingly, in the first embodiment, the vehicle-body-side system 2 is provided with a vehicle speed data acquiring function to transmit acquired vehicle speed data to the tire-side device 1, as will be described later. This configuration allows sampling for acquiring the road surface data to be started at an earlier time.

Figure 5B:
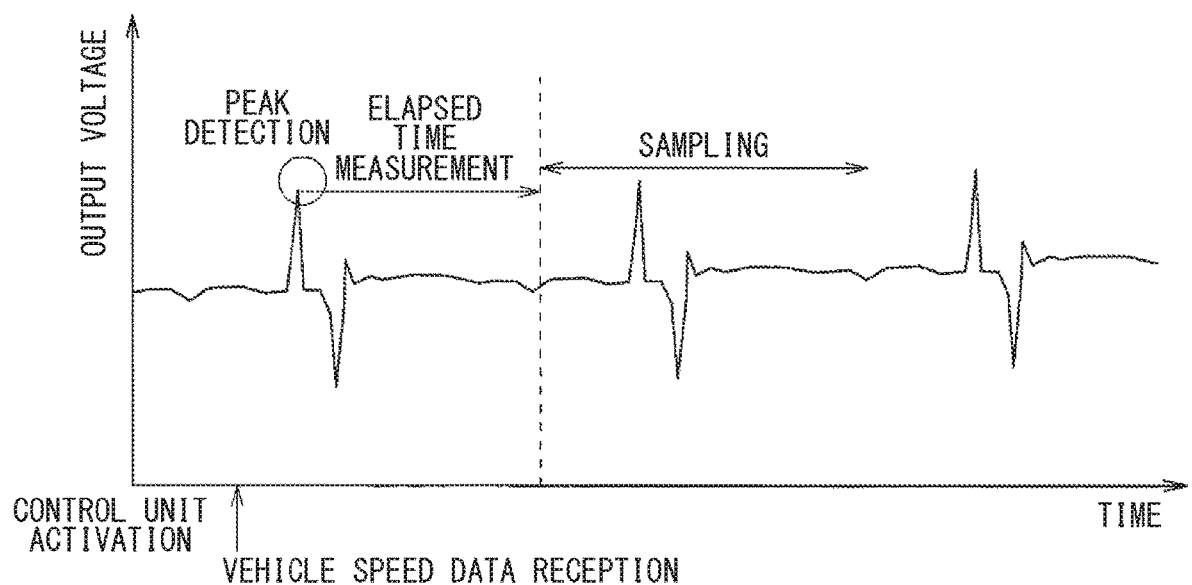
FIG. 5B is a time chart illustrating setting of a sampling range based on a detection signal during a rotation of a tire in accordance with a method according to the first embodiment.

Specifically, since the acquisition setting unit 11b has already recognized the vehicle speed based on the vehicle speed data transmitted from the vehicle-body-side system 2, the acquisition setting unit 11b sets the acquisition range for the detection signal based on the vehicle speed. Then, as illustrated in FIG. 5B, an elapsed time from the first peak value immediately after coming of the time point of transmitting the road surface data is measured. When the acquisition start time point comes, the acquisition is started. Subsequently, when the acquisition end time point comes, the acquisition is ended. With this configuration, it is possible to acquire the detection signal for generating the road surface data earlier by a time period corresponding to one tire rotation.

Note that, in the first embodiment, the control unit 11 is automatically switched to the wakeup state at each time point of transmitting the road surface data. The switching is achieved by estimating the next time point of transmitting the road surface data from the vehicle speed data transmitted from the vehicle-body-side system 2 at the previous acquisition of the road surface data. In other words, it is possible to calculate, based on the vehicle speed data transmitted from the vehicle-body-side system 2, the time before a predetermined distance or a predetermined number of tire rotations is reached. Accordingly, in order to switch to the wakeup state at the calculated next transmission time point, the control unit 11 sets a timer not shown.

The waveform processing unit 11c uses the detection signal output from the vibration sensor unit 10 as a detection signal indicative of vibration data in a tire tangential direction to perform waveform processing of a vibration waveform represented by the detection signal and thereby generate the road surface data. The acquisition of the waveform of the detection signal from the vibration sensor unit 10 by the waveform processing unit 11c is performed in accordance with the acquisition condition set by the acquisition setting unit 11b. The waveform acquisition is performed at a predetermined sampling frequency during a period from the acquisition start time point to the acquisition end time point. In the first embodiment, by performing signal processing of the detection signal for an acceleration (hereinafter referred to as the tire G) of the tire 3, the waveform processing unit 11c extracts a feature quantity of the tire G and generates data including the feature quantity as the road surface data. When the road surface data is generated, the waveform processing unit 11c transmits the road surface data to the data communication unit 12. Note that details of the feature quantity mentioned herein will be described later.

The waveform processing unit 11c controls data transmission from the data communication unit 12. The waveform processing unit 11c transmits the road surface data to the data communication unit 12 at a time point at which data transmission is desired to be performed to cause the data communication unit 12 to perform data communication. For example, the waveform processing unit 11c extracts the feature quantity of the tire G every time the tire 3 rotates a plurality of times and transmits the road surface data to the data communication unit 12 once or a plurality of times each time the tire 3 rotates a plurality of times, e.g., ten times. For example, the waveform processing unit 11c transmits, to the data communication unit 12, the road surface data including the feature quantity of the tire G extracted during one rotation of the tire 3 when the road surface data is transmitted to the data communication unit 12.

The data communication unit 12 is provided as a first data communication unit. For example, when the road surface data is transmitted from the waveform processing unit 11c to the data communication unit 12, the data communication unit 12 transmits the road surface data at that time point. The time point of the data transmission from the data communication unit 12 is controlled by the waveform processing unit 11c. Every time the road surface data is transmitted from the waveform processing unit 11c to the data communication unit 12 each time the tire 3 rotates a plurality of times, data transmission from the data communication unit 12 is performed.

The data communication unit 12 is capable of bidirectional communication, and receives data transmitted from the vehicle-body-side system 2. For example, the data communication unit 12 receives the vehicle speed data from the vehicle-body-side system 2 and transmits the vehicle speed data to the acquisition setting unit 11b.

The data communication unit 12 described herein has a single configuration, but may be configured as a transmission unit and a reception unit which are separate from each other. As a mode of the bidirectional communication, various modes can be used appropriately, and Bluetooth communication including BLE (abbreviation of Bluetooth Low Energy) communication, a wireless LAN (abbreviation of Local Area Network) such as wifi, Sub-GHz communication, ultra-wide band communication, ZigBee, or the like can be used. Note that Bluetooth is a "registered trademark".

The power source unit 13 serves as a power source of the tire-side device 1 and supplies power to each of the units included in the tire-side device 1 to operate each of the units. The power source unit 13 is provided by a battery such as, e.g., a button battery. Since the tire-side device 1 is provided in the tire 3, replacement of the battery cannot easily be performed, and therefore it is required to reduce power consumption.

Meanwhile, the receiver 21, the brake ECU 22, and the notification device 23 each included in the vehicle-body-side system 2 are driven when an activation switch such as an ignition switch not shown is turned ON.

As illustrated in FIG. 2, the receiver 21 includes a data communication unit 24, a road surface determination unit 25, and a vehicle speed data acquisition unit 26.

The data communication unit 24 is provided by a second data communication unit and performs bidirectional communication with the data communication unit 12 of the tire-side device 1. Specifically, the data communication unit 24 receives the road surface data including the feature quantity transmitted from the data communication unit 12 and transmits the road surface data to the road surface determination unit 25. The data communication unit 24 transmits the vehicle speed data transmitted from the vehicle speed data acquisition unit 26 to each of the tire-side devices 1. The data communication unit 24 described herein has a single configuration, but may be configured to include a transmission unit and a reception unit which are separate from each other.

The road surface determination unit 25 is provided by a known microcomputer including a CPU, a ROM, a RAM, an I/O, and the like and performs various processes based on programs stored in the ROM or the like to determine the road surface state. Specifically, the road surface determination unit 25 stores a support vector and compares the road surface data transmitted from the control unit 11 to the support vector to determine the road surface state.

The support vector is stored and accumulated for each type of the road surface. The support vector refers to the feature quantity serving as a model, which is obtained by, e.g., learning using a support vector machine. The vehicle including the tire-side devices 1 is experimentally caused to run on each type of the road surface. The feature quantities extracted at that time by the control unit 11 for a predetermined number of tire rotations are learned. From the extracted feature quantities, typical feature quantity corresponding to the predetermined number of rotations is extracted to be used as the support vector. For example, the feature quantities corresponding to 1,000,000 rotations are learned for each type of the road surface and, from the learned feature quantities, typical feature quantities corresponding to 100 rotations are extracted to be used as the support vector.

Then, the road surface determination unit 25 compares the feature quantity included in the road surface data transmitted from the tire-side device 1 and received by the data communication unit 24 to the respective support vector stored for each type of the road surface to determine the road surface state. For example, the road surface determination unit 25 compares the feature quantity included in the road surface data received most recently to the support vector stored for each type of the road surface, and determines the road surface corresponding to the support vector closest to the feature quantity to be a currently traveled road surface.

When determining the road surface state, the road surface determination unit 25 transmits the determined road surface state to the notification device 23 and causes the notification device 23 to transmit the road surface state to the driver as required. As a result, the driver tries to drive in consideration of the road surface state and can avoid danger to the vehicle. For example, the road surface determination unit 25 may constantly display the determined road surface state through the notification device 23 or may display the road surface state to warn the driver when the determined road surface state is that of a wet road, a frozen road, or the like, and the driver is required to drive carefully. In addition, the receiver 21 reports the road surface state to the ECU for performing the vehicle movement control, such as the brake ECU 22, to allow the vehicle movement control to be performed based on the reported road surface state.

The vehicle speed data acquisition unit 26 acquires the vehicle speed data which is data corresponding to the vehicle speed and transmits the vehicle speed data to the data communication unit 24 to transmit the vehicle speed data to each of the tire-side devices 1. For example, when the vehicle speed reaches a speed equal to or higher than a predetermined speed, e.g., 20 km/h at which the road surface state assumedly needs to be determined, the vehicle speed data acquisition unit 26 transmits the vehicle speed data to the data communication unit 24 at each time point of transmitting the road surface data. The vehicle speed data acquisition unit 26 may directly acquire data indicative of the very vehicle speed and transmit the acquired data as the vehicle speed data to the data communication unit 24. Alternatively, the vehicle speed data acquisition unit 26 may acquire data required to calculate the vehicle speed and transmit a result of the calculation as the vehicle speed data to the data communication unit 24. For example, since the brake ECU 22 processes the data indicative of the vehicle speed itself to perform brake control, the brake ECU 22 can transmit the data as the vehicle speed data to the vehicle speed data acquisition unit 26.

The brake ECU 22 may be provided by a braking control device which performs various brake control and drives an actuator for controlling a brake fluid pressure to automatically generate a brake fluid pressure, apply the pressure to a wheel cylinder, and generate the braking force. The brake ECU 22 may independently control a braking force applied to each of the wheels. When the road surface state is transmitted to the brake ECU 22 from the receiver 21, the brake ECU 22 performs control of the braking force as the vehicle movement control based on the road surface state. For example, when the transmitted road surface state indicates a frozen road, the brake ECU 22 reduces the braking force generated based on an amount of brake operation performed by the driver compared to that generated when the transmitted road surface state is a dry road surface. This configuration can reduce a wheel slip and allow the driver to avoid danger to the vehicle.

The notification device 23 may be provided by a meter indicator or the like and used when the road surface state is reported to the driver. When the notification device 23 is provided by the meter indicator, the meter indicator is disposed at a place where the meter indicator is visually recognizable by the driver while driving the vehicle and disposed in, e.g., an instrument panel in the vehicle. When the road surface state is transmitted from the receiver 21 to the meter indicator, the meter indicator performs display in a mode in which the driver can recognize the road surface state, and thus allows the road surface state to be visually reported to the driver.

Note that the notification device 23 may be provided by a buzzer, a voice guidance device, or the like. In that case, the notification device 23 can aurally report the road surface state to the driver using a buzzer sound or voice guidance. As the notification device 23 that performs visual reporting, the meter indicator has been described by way of example, but the notification device 23 may be provided by a display element which displays information, such as a head-up display.

As described above, the tire device 100 according to the first embodiment is configured. Note that the individual units included in the vehicle-body-side system 2 are connected to each other through an in-vehicle LAN (abbreviation of Local Area Network) based on, e.g., CAN (abbreviation of Controller Area Network) communication or the like. This configuration allows the individual units to transmit information to each other via the in-vehicle LAN.

Next, a description will be given of details of the feature quantity extracted by the control unit 11 described above.

The feature quantity mentioned herein is a quantity indicative of a feature of vibration applied to the tire 3, which have been acquired by the vibration sensor unit 10, and is represented as, e.g., a feature vector.

As described above, the waveform of the output voltage of the detection signal from the vibration sensor unit 10 has a waveform as illustrated in FIG. 4, and includes, e.g., the individual regions R1 to R5 illustrated in FIG. 4. Depending on the road surface state, vibration applied to the tire 3 varies from one of the regions resulting from the segmentation to another, and the detection signal from the vibration sensor unit 10 varies from one of the regions to another. Accordingly, by subjecting the detection signal from the vibration sensor unit 10 in each of the regions to frequency analysis, the road surface state of the road surface traveled by the vehicle is detected. For example, in a slippery road surface state such as that of a hard-compacted snow road, a sheering force at a kick-out time deteriorates, and consequently a band value selected in a 1 kHz to 4 kHz band decreases in the kick-out region R4 and the post-kick-out region R5. Thus, each of frequency components of the detection signal from the vibration sensor unit 10 varies depending on the road surface state, and therefore it is possible to determine the road surface state based on the frequency analysis of the detection signal.

Figure 6:
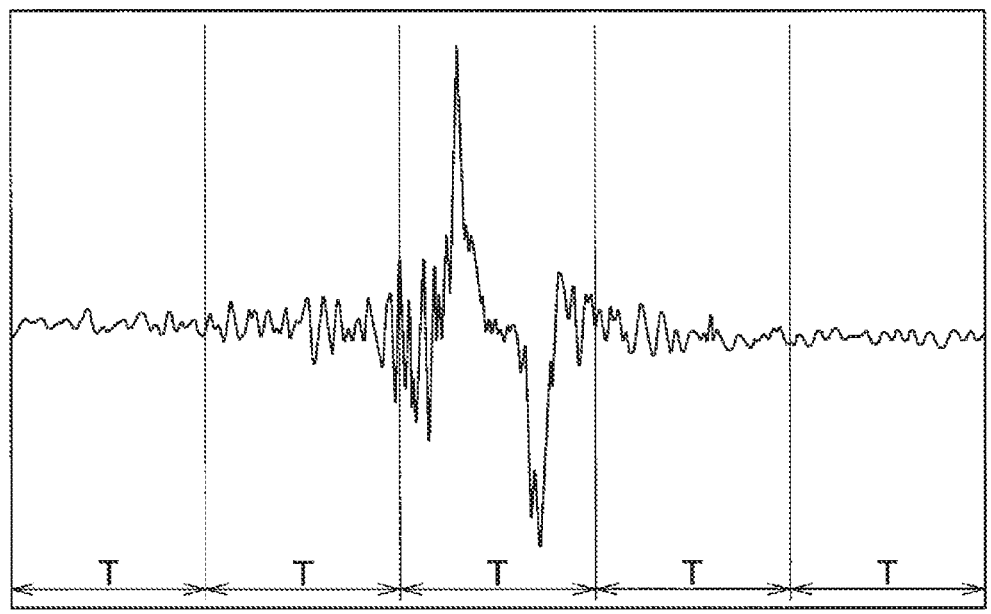
FIG. 6 is a diagram illustrating segmentation of a detection signal from the acceleration acquisition unit by each of time windows having a predetermined time width T.

Accordingly, the waveform processing unit 11c segments, by each of time windows having a predetermined time width T, the detection signal from the vibration sensor unit 10 corresponding to one rotation of the tire 3 which exhibits a continuous time axis waveform into the plurality of segments as illustrated in FIG. 6, and performs the frequency analysis in each of the segments to extract the feature quantity. Specifically, by performing the frequency analysis in each of the segments, the waveform processing unit 11c determines a power spectral value in each of the frequency bands, i.e., a vibration level in a specified frequency band, and uses the power spectral value as the feature quantity.

Note that the number of the segments divided by the time window having the time width T varies based on a vehicle speed. More specifically, the number of the segments divided by the time window having the time width T varies based on the rotating speed of the tire 3. In the following description, the number of segments corresponding to one rotation of the tire is assumed to be n (n is a natural number).

For example, the power spectral value obtained by causing the detection signal in each of the segments to pass through filters in a plurality of specified frequency bands, e.g., five bandpass filters of, e.g., a 0 to 1 kHz frequency band, a 1 to 2 kHz frequency band, a 2 to 3 kHz frequency band, a 3 to 4 kHz frequency band, and a 4 to 5 kHz frequency band is used as the feature quantity. The feature quantity is referred to as the feature vector. When each of the power spectral values in the individual specified frequency bands is represented by $a_{ik}$, a feature vector $X_i$ of a given segment i (where i is a natural number satisfying $1 \leq i \leq n$) is given as a matrix having the power spectral values $a_{ik}$ as elements by the following expression.

$$x_i = \begin{bmatrix} a_{i1} \\ a_{i2} \\ a_{i3} \\ a_{i4} \\ a_{i5} \end{bmatrix} \quad \text{(Expression 1)}$$

Note that k in each of the power spectral values $a_{ik}$ is the number of the specified frequency bands, i.e., the number of the bandpass filters. When the 0 to 5 kHz band is segmented into the five regions as described above, k=1 to 5 is satisfied.

A determinant X collectively showing feature vectors X1 to Xn of all the segments 1 to n is given by the following expression.

$$X = \begin{pmatrix} a_{11} & a_{21} & \ldots & a_{n1} \\ a_{12} & a_{22} & \ldots & a_{n2} \\ a_{13} & a_{23} & \ldots & a_{n3} \\ a_{14} & a_{24} & \ldots & a_{n4} \\ a_{15} & a_{25} & \ldots & a_{n5} \end{pmatrix} \quad \text{(Expression 2)}$$

The determinant X serves as the expression indicative of the feature quantity corresponding to one tire rotation. The control unit 11 performs frequency analysis of the detection signal from the vibration sensor unit 10 to extract the feature quantity represented by the determinant X.

Subsequently, a description will be given of an operation of the tire device 100 according to the first embodiment.

First, in the receiver 21, the vehicle speed data acquisition unit 26 acquires the vehicle speed data. As the vehicle speed data, the vehicle speed data processed in, e.g., the brake ECU 22 can be acquired via the in-vehicle LAN or the like. Then, the vehicle speed data acquisition unit 26 transmits the vehicle speed data to the data communication unit 24 at a predetermined time point and to each of the tire-side devices 1 through the data communication unit 24. For example, the vehicle speed data acquisition unit 26 can estimate, based on the vehicle speed data, a time required by the vehicle to travel a predetermined distance, i.e., a time required by the tire 3 to rotate a predetermined number of times. Accordingly, the vehicle speed data acquisition unit 26 causes the data communication unit 24 to transmit the vehicle speed data at each time point of transmission of the road surface data from each of the tire-side devices 1.

Meanwhile, each of the tire-side devices 1 is in the sleep state before the vehicle drives, but is activated when the vehicle has started to drive. For example, the control unit 11 receives the detection signal from the vibration sensor unit 10, senses a rotation of the tire 3, i.e., the driving of the vehicle based on the waveform of the detection signal exceeding a predetermined threshold, and activates each of functions placed in the sleep state. Then, the vehicle speed data is transmitted from the receiver 21 and delivered to the acquisition setting unit 11b. Consequently, the acquisition setting unit 11b sets the acquisition condition, i.e., sampling condition. Specifically, the acquisition setting unit 11b sets the acquisition range for the acquisition of the detection signal from the vibration sensor unit 10, which is performed to generate the road surface data, and sets the acquisition start time point and the acquisition end time point. As necessary, the acquisition setting unit 11b may perform setting of the sampling frequency based on the vehicle speed or the like.

Then, in each of the tire-side devices 1, the peak detection unit 11a detects a time point at which the first peak value is reached from the detection signal from the vibration sensor unit 10, and the acquisition setting unit 11b measures an elapsed time from the time point at which the first peak value is reached. Then, when the elapsed time reaches the acquisition start time point, the waveform processing unit 11c acquires the waveform of the detection signal from the vibration sensor unit 10 in accordance with the acquisition condition set by the acquisition setting unit 11b. At this time, when the time point at which the first peak value is reached is detected, the sampling frequency is set relatively low to reduce the power consumption while, when the waveform is acquired, the sampling frequency is set higher to allow detailed data to be acquired.

It is assumed that, for the setting of the acquisition range for the detection signal, the tire is rotated once. However, depending on the required road surface data, the acquisition range for the detection signal may be set smaller than a range corresponding to one tire rotation. For example, the road surface state appears as a change in the waveform of the output voltage of the detection signal particularly during a period including the "step-on region", the "pre-kick-out region", the "kick-out region", and the periods before and after these regions. Accordingly, it is sufficient that data during these periods is received, and it is not necessarily required that all the data sets represented by the detection signal from the vibration sensor unit 10 during one tire rotation is received. For example, with respect to the "pre-step-on region" and the "post-kick-out region", it is sufficient that there is data in the vicinity of the "step-on region" and in the vicinity of the "kick-out region". Therefore, it may be possible to regard a region of the detection signal from the vibration sensor unit 10 where the vibration level is smaller than a predetermined threshold as a period included in the "pre-step-on region" or the "post-kick-out region" during which the detection signal is less likely to be affected by the road surface state and prevent the detection signal from being received.

Immediately after the vehicle started to drive, the vehicle speed data has not been transmitted to the control unit 11, and therefore switching between the sleep state and the wakeup state cannot be performed based on the vehicle speed. However, when the vehicle speed reaches a predetermined speed, e.g., 20 km/h, the vehicle speed data is transmitted from the receiver 21. Accordingly, even when the control unit 11 is left in the wakeup state during a period before the vehicle speed reaches the predetermined speed, it is possible to avoid excessive consumption of power.

Then, the waveform processing unit 11c performs signal processing of the acquired detection signal to extract the feature quantity of the tire G, generates the road surface data including the feature quantity, and transmits the road surface data to the data communication unit 12. As a result, the road surface data is transmitted from each of the tire-side devices 1 to the vehicle-body-side system 2 through the data communication unit 12.

Meanwhile, when the road surface data is transmitted, the data communication unit 24 in the receiver 21 receives the road surface data and transmits the road surface data to the road surface determination unit 25. Then, the road surface determination unit 25 determines the road surface state. Specifically, the road surface determination unit 25 compares the feature quantity included in the received road surface data to the support vector stored for each type of the road surface in the road surface determination unit 25 so as to determine the road surface state. For example, the road surface determination unit 25 determines the degree of similarity of the feature quantity to all the support vector stored for each type of the road surface, and determines that the road surface corresponding to the support vector having the highest degree of similarity is the currently traveled road surface.

For example, the calculation of the degree of similarity of the feature quantity to all the support vector stored for each type of the road surface can be performed by a method as described below.

As described above, it is assumed, with respect to the determinant X indicative of the feature quantity, that a determinant indicative of the feature quantity is X(r), a determinant indicative of the support vector is X(s), and the power spectral values $a_{ik}$ serving as respective elements of the determinant are represented by $a(r)_{ik}$ and $a(s)_{ik}$. In that case, the determinant X(r) indicative of the feature quantity and the determinant X(s) indicative of the support vector are represented as follows.

$$x(r) = \begin{pmatrix} a(r)_{11} & a(r)_{21} & \cdots & a(r)_{n1} \\ a(r)_{12} & a(r)_{22} & \cdots & a(r)_{n2} \\ a(r)_{13} & a(r)_{23} & \cdots & a(r)_{n3} \\ a(r)_{14} & a(r)_{24} & \cdots & a(r)_{n4} \\ a(r)_{15} & a(r)_{25} & \cdots & a(r)_{n5} \end{pmatrix} \quad \text{(Expression 3)}$$

$$x(s) = \begin{pmatrix} a(s)_{11} & a(s)_{21} & \cdots & a(s)_{n1} \\ a(s)_{12} & a(s)_{22} & \cdots & a(s)_{n2} \\ a(s)_{13} & a(s)_{23} & \cdots & a(s)_{n3} \\ a(s)_{14} & a(s)_{24} & \cdots & a(s)_{n4} \\ a(s)_{15} & a(s)_{25} & \cdots & a(s)_{n5} \end{pmatrix} \quad \text{(Expression 4)}$$

The degree of similarity represents a degree to which the feature quantity and the support vector indicated by the two determinants are similar to each other, and indicates that, as the degree of similarity is higher, the feature quantity and the support vector are more similar to each other. In the first embodiment, the road surface determination unit 25 determines the degree of similarity using a kernel method, and determines the road surface state based on the degree of similarity. The road surface determination unit 25 calculates herein an inner product of the determinant X(r) indicative of the feature quantity and the determinant X(s) indicative of the support vector, i.e., a distance between respective coordinates represented by the respective feature vectors Xi of the individual segments resulting from the segmentation using each of the time windows having the predetermined time width T in a feature space, and uses the inner product as the degree of similarity.

Figure 7:
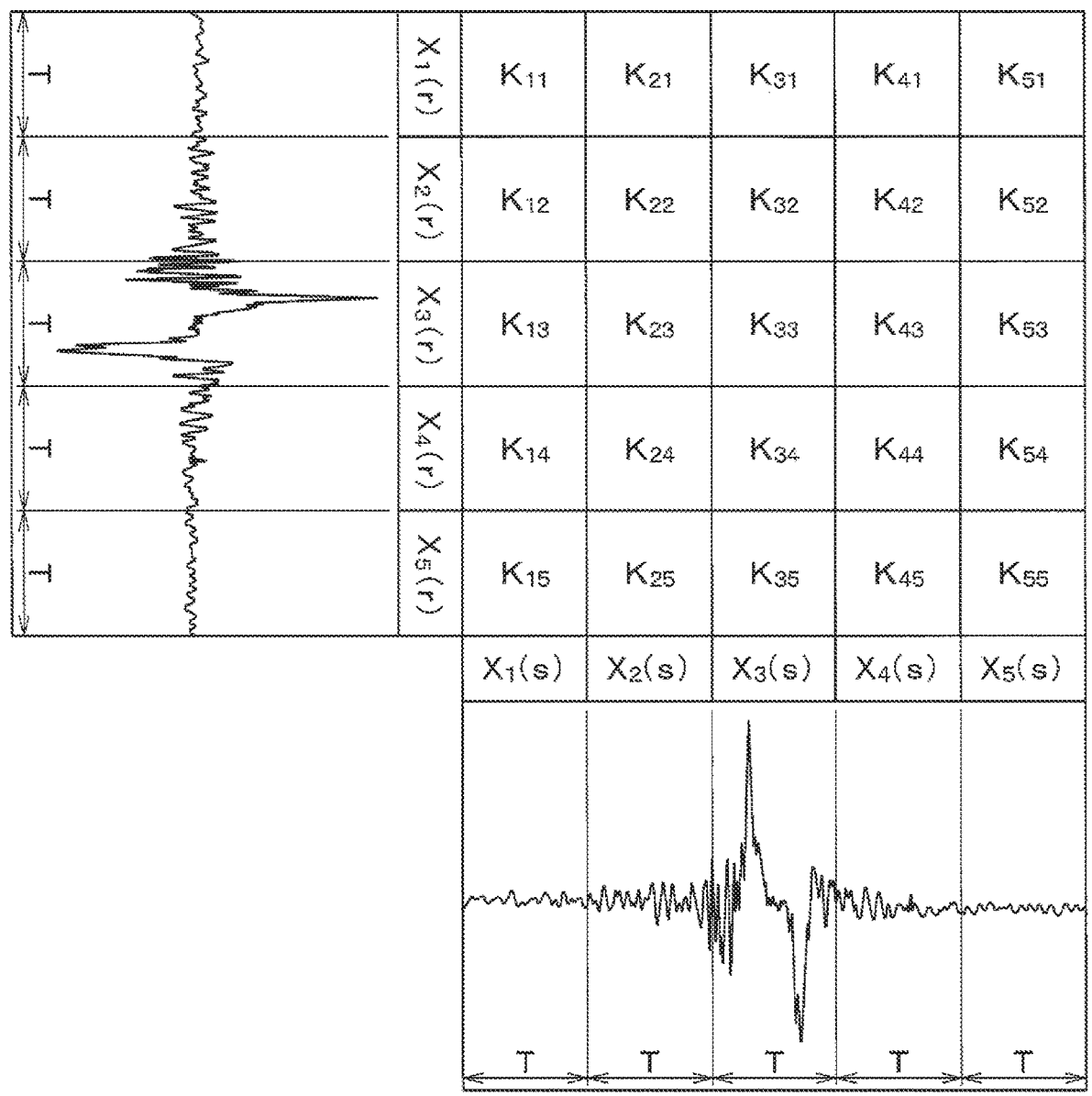
FIG. 7 is a diagram illustrating relationships between determinants $Xi(r)$ and $Xi(s)$ and a distance $K_{yz}$ in each of segments resulting from segmentation of a time axis waveform during a most recent rotation of the tire and a time axis waveform during an immediately previous rotation of the tire by each of the time windows having the predetermined time width T.

For example, as illustrated in FIG. 7, as the time axis waveform of the detection signal from the vibration sensor unit 10, each of the time axis waveform during the most recent rotation of the tire 3 and the time axis waveform of the support vector is segmented into individual segments by the time window having the predetermined time width T. In the case of the illustrated example, each of the time axis waveforms is segmented into the five segments, and accordingly n=5 is satisfied, and i is given by 1≤i≤5. It is assumed herein that, as illustrated in the drawing, the feature vectors Xi of the individual segments during the most recent rotation of the tire 3 are Xi(r), and the feature vectors of the individual segments of the support vector are Xi(s). In that case, distances $K_{yz}$ between the coordinates represented by the feature vectors Xi of the individual segments are represented as in cells where cells including the feature vectors Xi(r) of the individual segments during the most recent rotation of the tire 3, which are arranged laterally to cells containing the distances $K_{yz}$, and cells including the feature vectors Xi(s) of the individual segments of the support vector, which are arranged vertically to the cells containing the distances $K_{yz}$, cross each other. Note that, in each of the distances $K_{yz}$, y corresponds to i in Xi(s), while z corresponds to i in Xi(r). Actually, depending on the vehicle speed, the number of the segments during the most recent rotation of the tire 3 may be different from the number of the segments of the support vector. However, a case where the number of the segments during the most recent rotation of the tire 3 is the same as the number of the segments of the support vector is shown by way of example.

In the first embodiment, the feature vectors are acquired by segmenting each of the time axis waveforms into the five specified frequency bands. Consequently, the feature vectors $X_i$ of the individual segments are represented in a six-dimensional space including the time axis, and the distances between the coordinates represented by the feature vectors $X_i$ of the individual segments correspond to distances between the coordinates in the six-dimensional space. The distances between the coordinates represented by the feature vectors of the individual segments are smaller as the feature quantity and the support vector are more similar to each other and larger as the feature quantity and the support vector are less similar to each other. Thus, smaller distances represent higher degree of similarity, while larger distances represent lower degree of similarity.

For example, when segments 1 to n are provided by time division, each of the distances $K_{yz}$ between the coordinates represented by the feature vectors of the individual segments 1 is given by the following expression.

$$K_{yz} = \sqrt{\{a(r)_{11} - a(s)_{11}\}^2 + \{a(r)_{12} - a(s)_{12}\}^2 + \ldots + \{a(r)_{15} - a(s)_{15}\}^2} \quad \text{(Expression 5)}$$

Thus, the distances $K_{yz}$ between the coordinates represented by the feature vectors of the individual segments obtained by time division are determined for all the segments, a total sum $K_{total}$ of the distances $K_{yz}$ for all the segments is arithmetically determined, and the total sum $K_{total}$ is used as a value corresponding to the degree of similarity. Then, the total sum $K_{total}$ is compared to a predetermined threshold Th. When the total sum $K_{total}$ is larger than the threshold Th, it is determined that the degree of similarity is low. When the total sum $K_{total}$ is smaller than the threshold Th, it is determined that the degree of similarity is high. Such calculation of the degree of similarity is performed with respect to all the support vector, and it is determined that the type of the road surface corresponding to the support vector having the highest degree of similarity is the currently traveled road surface state. Thus, the road surface state can be determined.

Note that, as a value corresponding to the degree of similarity, the total sum $K_{total}$ of the distances $K_{yz}$ each between the two coordinates represented by the feature vectors of the individual segments is used, but it is also possible to use another value as a parameter indicative of the degree of similarity. For example, as the parameter indicative of the degree of similarity, an average distance $K_{ave}$ as an average value of the distances $K_{yz}$, which is obtained by dividing the total sum $K_{total}$ by the number of the segments, can be used. Alternatively, it is also possible to determine the degree of similarity using various kernel functions. Still alternatively, it may be possible to arithmetically determine the degree of similarity by removing paths having lower degree of similarity from all the feature vectors without using all the feature vectors.

As described above, the tire device 100 according to the first embodiment can determine the road surface state of the road surface traveled by the vehicle. When the road surface data to be used in performing such determination of the road surface state is generated, the vehicle-body-side system 2 transmits the vehicle speed data. Then, the tire-side device 1 sets, based on the vehicle speed data, the acquisition condition for the waveform processing unit 11c so that the vibration sensor unit 10 acquires the detection signal.

Accordingly, the elapsed time from the first peak value of the detection signal immediately after the coming of the time point of transmitting the road surface data is measured and, when the acquisition start time point comes, the acquisition can be started. It is possible to acquire the detection signal for generating the road surface data earlier by a time period corresponding to one tire rotation and start the sampling for acquiring the road surface data at an earlier time. Therefore, it is possible to provide the tire system including the road surface state determination device which allows the sampling condition for the waveform of the vibration applied to the tire 3 to be determined with good responsiveness. Moreover, since the sampling condition for the waveform of the vibration applied to the tire 3 can be determined with good responsiveness, it is possible to promptly respond to a sudden change in the road surface state. Since the time required to bring the control unit 11 into the wakeup state in order to generate the road surface data can be reduced, it is also possible to reduce the power consumption.

Second Embodiment

A description will be given of the second embodiment. The second embodiment is obtained by modifying the configuration of each of the tire-side devices 1 in the first embodiment and is otherwise the same as the first embodiment. Therefore, a description will be given only of portions different from those in the first embodiment.

Figure 8:
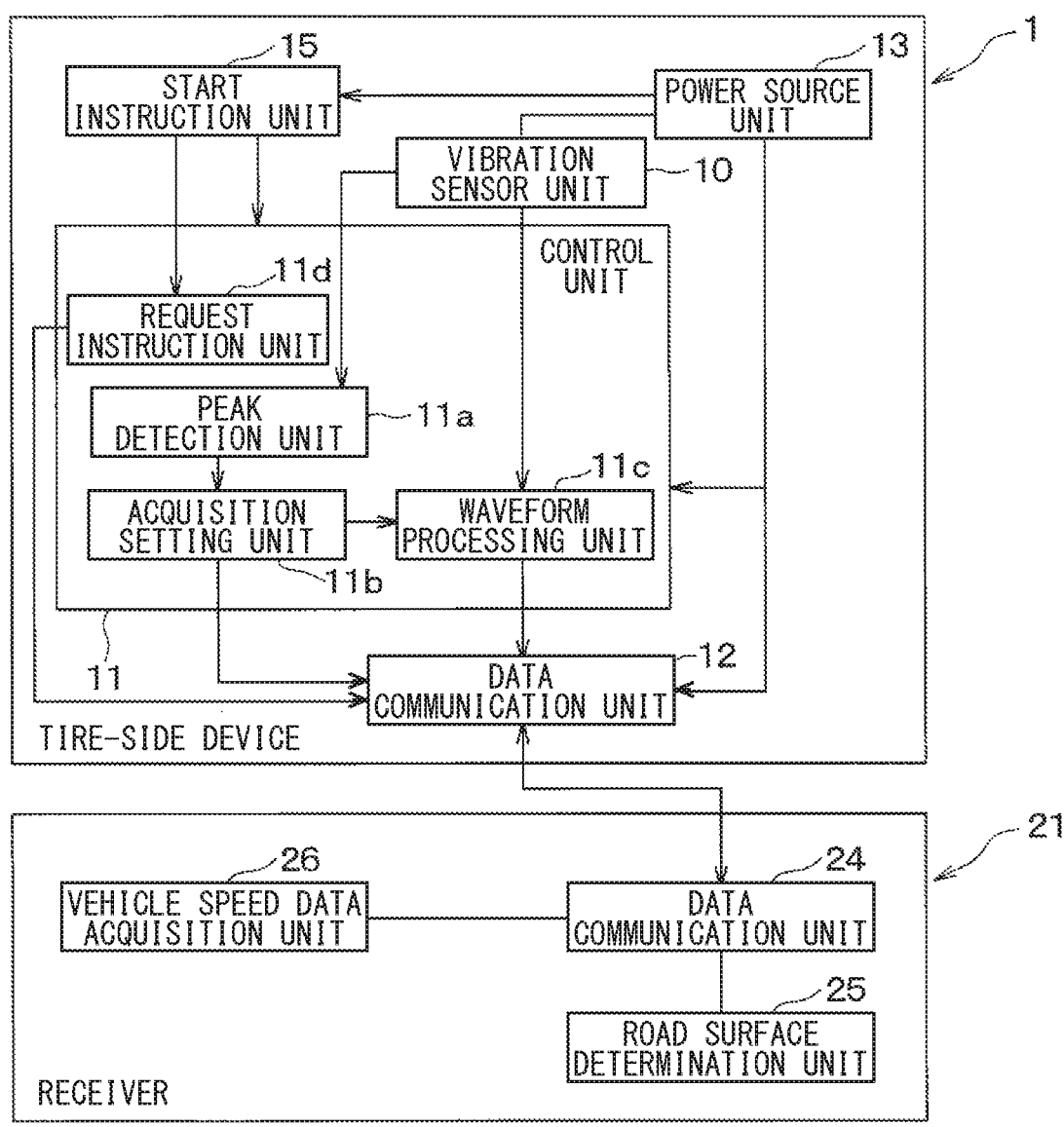
FIG. 8 is a block diagram illustrating a tire-side device and a vehicle-body-side system included in a tire device according to a second embodiment.

As illustrated in FIG. 8, in the second embodiment, the tire-side device 1 includes a start instruction unit 15, and the control unit 11 includes a request instruction unit 11d.

The start instruction unit 15 detects a start of driving of the vehicle and activates, when detecting the start of the driving of the vehicle, the control unit 11 to allow the control unit 11 to start to generate the road surface data. For example, the start instruction unit 15 is provided by an acceleration sensor which detects an acceleration of the tire 3 in a radial direction or the like, and outputs a detection signal corresponding to the acceleration of the tire 3 in the radial direction. An electric output represented by the detection signal, i.e., an output voltage or an output current is input to the control unit 11 and, when the electric output exceeds a predetermined threshold, the control unit 11 is activated.

When activated based on an instruction from the start instruction unit 15, i.e., the detection signal from the start instruction unit 15, the control unit 11 then causes the request instruction unit 11d to output a signal requesting the vehicle speed data, and causes the data communication unit 12 to transmit the request signal to the vehicle-body-side system 2. When receiving the request signal from the tire-side device 1, the vehicle-body-side system 2 causes the vehicle speed data acquisition unit 26 to transmit the vehicle speed data through the data communication unit 24. Thus, the vehicle-body-side system 2 transmits the vehicle speed data based on the request signal from the tire-side device 1.

The signal requesting the vehicle speed data from the request instruction unit 11d may be output when the control unit 11 is activated regardless of the rotating speed of the tire 3. Alternatively, the signal requesting the vehicle speed data may be output when it is assumed that the vehicle speed becomes equal to or higher than a predetermined speed. Since the detection signal from the start instruction unit 15 includes a centrifugal acceleration and a gravitational acceleration of the tire 3, the vehicle speed can be estimated based on the centrifugal acceleration or the gravitational acceleration. In addition, since the waveform processing unit 11c is activated when the control unit 11 is activated, the waveform processing unit 11c can estimate the vehicle speed by sampling the detection signal from the vibration sensor unit 10 at a relatively low sampling frequency. Consequently, it is possible to estimate the vehicle speed based on the detection signal from the start instruction unit 15 or on a detection signal from the waveform processing unit 11c, and cause the request instruction unit 11d to output the signal requesting the vehicle speed data when the vehicle speed becomes equal to or higher than the predetermined speed.

Since the tire-side device 1 also estimates the vehicle speed herein, it may be considered that the tire-side device 1 can conceivably set the sampling conditions for the detection signal from the vibration sensor unit 10 even when the tire-side device 1 does not request the vehicle speed data from the vehicle-body-side system 2. However, even when estimating the vehicle speed, the tire-side device 1 requests the vehicle speed data from the vehicle-body-side system 2 for the following reason.

As described above, power is consumed by the waveform processing unit 11c when performing sampling and, when the sampling is performed continuously for a long period of time, the power consumption increases. Accordingly, after the vehicle speed becomes equal to or higher than the predetermined speed, the control unit 11 is preferably brought into the sleep state at times other than a time point of transmitting the road surface data. However, when the control unit 11 is brought into the sleep state, the waveform processing unit 11c cannot perform sampling during a period during which the control unit 11 is in the sleep state, and consequently the vehicle speed cannot be estimated. As a result, even when the tire-side device 1 estimates the vehicle speed for the control of the activation of the control unit 11, the estimated vehicle speed cannot be used for the setting of the sampling condition for the detection signal from the vibration sensor unit 10. Therefore, the vehicle speed data is requested from the vehicle-body-side system 2.

After the vehicle speed becomes equal to or higher than the predetermined speed, during a period during which the vehicle speed equal to or higher than the predetermined speed is maintained, the request instruction unit 11d requests the vehicle speed data from the vehicle-body-side system 2 at each time point of transmitting the road surface data, e.g., every time the vehicle travels 20 m. At this time, as described above, the control unit 11 is brought into the sleep state at times other than a time point of transmitting the road surface data. Accordingly, the request instruction unit 11d calculates a next transmission time point from the vehicle speed represented by the road surface data received at the previous time point of transmitting the road surface data or from the vehicle speed calculated from a time interval between the first peak values at the previous time point of transmitting the road surface data. Then, the control unit 11 sets a timer not shown so as to be switched to the wakeup state at the calculated transmission time point.

Thus, the vehicle-body-side system 2 may be configured to transmit the vehicle speed data based on the request signal from the tire-side device 1.

Other Embodiments

While the present disclosure has been described in accordance with the embodiments described above, the present disclosure is not limited to the embodiments and encompasses various modifications and variations in the equivalent range. In addition, various combinations and modes, and further, other combinations and modes including only one element thereof, less or more, are intended to fall within the scope and spirit of the present disclosure.

(1) For example, in each of the embodiments described above, the elapsed time from the first peak value of the detection signal from the vibration sensor unit 10 is measured based on the vehicle speed data from the vehicle-body-side system 2 and, when the acquisition start time point comes, the detection signal is acquired. However, since the vehicle speed is determined based on the vehicle speed data and a period required for one tire rotation is determined, when the detection signal from the vibration sensor unit 10 is acquired during the period required for one tire rotation, it is possible to generate the road surface data without measuring the elapsed time from the first peak value. However, in that case, the acquisition may possibly be performed midway during the period during which the device mounting position is in contact with the ground. Accordingly, it is preferred to add, to the period required for one tire rotation, a predetermined time shorter than the period required for one tire rotation, e.g., a period required for a ⅓ tire rotation such that at least the entire region of the tire in contact with the ground is included in the acquisition range during the period during which the device mounting position is in contact with the ground and acquire the detection signal.

When the detection signal is thus acquired, a sampling time period becomes longer than that when the elapsed time from the first peak value is measured and then the detection signal is acquired. This configuration allows sampling to be started at an earlier time. Therefore, it is possible to start the transmission of the road surface data to the vehicle-body-side system 2 at an earlier time.

(2) Also, in each of the embodiments described above, the elapsed time from the first peak value is used as an example of the elapsed time from the peak value based on which the acquisition start time point and the acquisition end time point are measured. However, an elapsed time from the second peak value may be used instead.

(3) Also, for example, in each of the embodiments described above, the case where the vibration sensor unit 10 is provided by the acceleration sensor is shown by way of example. However, the vibration sensor unit 10 may be provided by another element capable of detecting vibration such as, e.g., a piezoelectric element.

(4) Also, in each of the embodiments described above, as the road surface data indicative of the road surface state appearing in the detection signal from the vibration sensor unit 10 of the tire-side device 1, the data including the feature quantity is used. However, this is an exemplary, and another data may be used as the road surface data. For example, integral value data of individual vibration waveforms in the five regions R1 to R5 included in the vibration data during one rotation of the tire 3 may be used as the road surface data or, alternatively, raw data represented by the detection signal may be used as the road surface data.

(5) Also, in each of the embodiments described above, the road surface determination unit 25 of the receiver 21 included in the vehicle-body-side system 2 determines the degree of similarity of the feature quantity to the support vector to determine the road surface state.

However, this is an exemplary, and it may be possible that any portion of the vehicle-body-side system 2, e.g., another ECU such as the brake ECU 22 determines the degree of similarity, determines the road surface state, and transmits the instruction signal. Alternatively, it may be possible to store the support vector in each of the tire-side devices 1, allow the tire-side device 1 to determine the road surface state, and allow the tire-side device 1 to transmit data indicative of a result of the determination of the road surface state as the road surface data to the vehicle-body-side system 2.

What is claimed is:

1. A road surface state determination device comprising:
  a tire-side device attached to a back surface of a tread of each of a plurality of tires included in a vehicle; and
  a vehicle-body-side system included in a body of the vehicle, wherein:
  the tire-side device includes
    a vibration detection unit configured to output a detection signal corresponding to a magnitude of vibration applied to the tire,
    a controller configured to acquire the detection signal and generate road surface data indicative of a road surface state appearing in a waveform of the detection signal, and
    a first data communication unit configured to transmit the road surface data;
  the vehicle-body-side system includes
    a second data communication unit configured to perform bidirectional communication with the tire-side device and receive the road surface data,
    a road surface determination unit configured to determine the road surface state of a road surface on which the vehicle is traveling based on the road surface data, and
    a vehicle speed data acquisition unit configured to acquire vehicle speed data provided as data corresponding to a vehicle speed which is a speed of the vehicle and cause the second data communication unit to transmit the vehicle speed data to the tire-side device; and
  the controller includes an acquisition setting unit configured to set an acquisition condition for acquiring the detection signal based on the vehicle speed data.

2. The road surface state determination device according to claim 1, wherein
  the controller sets, as the acquisition condition, an acquisition range for acquiring the detection signal.

3. The road surface state determination device according to claim 2, wherein
  the controller further includes a peak detection unit configured to detect at least one of a first peak value of the detection signal which is taken when a device mounting position that is a portion of the tread corresponding to a place where the vibration detection unit is attached comes into contact with a ground during a rotation of the tire and a second peak value of the detection signal which is taken when the device mounting position comes out of contact with the ground, and
  the acquisition setting unit measures, based on an elapsed time from the first peak value or the second peak value, a time point to start acquiring the detection signal and a time point to stop acquiring the detection signal of the acquisition range.

4. The road surface state determination device according to claim 1, wherein
  the acquisition setting unit sets, as the acquisition condition, a sampling frequency for acquiring the detection signal.

5. The road surface state determination device according to claim 1, wherein:
  the tire-side device further includes a start instruction unit configured to activate the controller when detecting a start of driving of the vehicle; and
  the controller further includes a request instruction unit configured to request the vehicle speed data acquisition unit to transmit the vehicle speed data when the start instruction unit detects the start of driving of the vehicle and activates the controller.

6. A road surface state determination device comprising:
  a tire-side device attached to a back surface of a tread of each of a plurality of tires included in a vehicle; and
  a vehicle-body-side system included in a body of the vehicle, wherein:
  the tire-side device includes
    a sensor configured to output a detection signal corresponding to a magnitude of vibration applied to the tire,
    a first processor configured to acquire the detection signal and generate road surface data indicative of a road surface state appearing in a waveform of the detection signal, and
    a first transceiver configured to transmit the road surface data;
  the vehicle-body-side system includes
    a second transceiver configured to perform bidirectional communication with the tire-side device and receive the road surface data, and
    a second processor configured to
      determine the road surface state of a road surface on which the vehicle is traveling based on the road surface data, and
      acquire vehicle speed data provided as data corresponding to a vehicle speed which is a speed of the vehicle and cause the second transceiver to transmit the vehicle speed data to the tire-side device; and
  the first processor is further configured to set an acquisition condition for acquiring the detection signal based on the vehicle speed data.

7. The road surface state determination device according to claim 6, wherein
  the first processor sets, as the acquisition condition, an acquisition range for acquiring the detection signal.

8. The road surface state determination device according to claim 7, wherein
  the first processor is further configured to detect at least one of a first peak value of the detection signal which is taken when a device mounting position that is a portion of the tread corresponding to a place where the sensor is attached comes into contact with a ground during a rotation of the tire and a second peak value of the detection signal which is taken when the device mounting position comes out of contact with the ground, and
  the first processor measures, based on an elapsed time from the first peak value or the second peak value, a time point to start acquiring the detection signal and a time point to stop acquiring the detection signal of the acquisition range.

9. The road surface state determination device according to claim 6, wherein
  the first processor sets, as the acquisition condition, a sampling frequency for acquiring the detection signal.

10. The road surface state determination device according to claim 6, wherein:

the tire-side device further includes a third processor configured to activate the first processor when detecting a start of driving of the vehicle; and the first processor is further configured to request the second processor to transmit the vehicle speed data when the third processor detects the start of driving of the vehicle and activates the first processor.

\* \* \* \* \*